INVENTORS
DONALD J. LEM
WILHELM G. SPRUTH
BY
Thomas J. Kilgannon Jr.
ATTORNEY

BLS DATA FLOW

C-LINE DIAGRAM

OUTPUT TO A LOW SPEED LINE

TYPICAL INDIVIDUAL TERMINAL QUEUES

ASSIGNMENT OF SLOTS C-LINE AND M-1 LINE

ASSIGNMENT OF BLOCKS IN M-1 TO SLOTS IN C

TIMING WAVEFORMS FOR D-LINE

BLOCK DIAGRAM OF BLS INTERFACES

D-LINE BLOCK DIAGRAM

United States Patent Office 3,432,815

Patented Mar. 11, 1969

3,432,815

SWITCHING LOGIC FOR A TWO-DIMENSIONAL MEMORY

Donald J. Lem, Peekskill, N.Y., and Wilhelm G. Spruth, Boeblingen, Germany, assignors to International Business Machines Corporation, Armonk, N.Y., a corporation of New York Filed Feb. 15, 1965, Ser. No. 432,531

U.S. Cl. 340—173 12 Claims

Int. Cl. G11b 9/00

ABSTRACT OF THE DISCLOSURE

A self organizing delay device memory arrangement which is two dimensional and the switching logic which controls the flow of information among a plurality of delay devices and through a plurality of delay devices is described. The switching logic consisting of feedback paths each associated with a delay device which is adapted to stored data. An actuable gate is coupled between each of the feedback paths for successively transferring stored data from a delay device to the next succeeding delay device in the same time slot. A second actuable gate is coupled between the first and last of the feedback paths for transferring stored data therebetween and a delay element is interposed in the first feedback path for positioning the transferred data in a different portion of the same time slot.

Two-dimensional memories incorporating ultrasonic delay lines may be effectively utilized in systems which interconnect a main information center and computer with a plurality of remote terminals where the information sent to one terminal affects the information which may be provided at any other terminal.

One application for such memories would be in transportation or hotel reservation systems where remote, local terminals must know if accommodations are available to function effectively. Such memories are, however, not limited to use in such systems but may be utilized in any application where relatively fast access time and low cost relative to high density core storage are desirable features.

It is, therefore, an object of this invention to provide simple and inexpensive switching logic for controlling the flow of information along the length of a magnetostrictive delay line and between delay line members of a memory consisting of a plurality of delay lines.

Another object is to provide switching logic which is adapted to be time-shared by a plurality of slot positions which in turn relate to a plurality of remote terminals.

Another object is to provide switching logic which is adapted to permit successive transfers of information between delay lines in a given time slot and also permit transfers between the first and last of a plurality of delay lines in the same time slot but displaced by one of a number of data positions from its original position.

Still another object is to provide a logical circuitry arrangement which is capable of handling a plurality input and output terminals simultaneously and is capable of transferring information within the delay line memory without external status or control information.

A feature of this invention is the utilization in a two-dimensional memory which includes at least two delay devices which are adapted to store data of switching logic having a feedback path associated with each of the delay devices and at least an actuable gate interconnecting said feedback paths for transferring data between the two delay devices.

Another feature is the utilization in a two-dimensional memory which includes a plurality of delay devices of a plurality of feedback paths associated with each of the delay devices and an actuable gate coupled to each of the feedback paths for transferring data stored on each of the delay devices to a different one of the feedback paths.

Another feature is the utilization in a two-dimensional memory which includes $n$ delay devices of switching logic consisting of a plurality of feedback paths each associated with a delay device adapted to store data; different portions of data being assigned to different time slots. A first actuable gate coupled to each of the feedback paths for successively transferring stored data of each of the delay devices to the next succeeding of the $n$ delay devices in the same time slot is also utilized. Further, a second actuable gate is coupled between the first and last of the feedback paths for transferring stored data therebetween and a delay element is interposed in the first feedback path for positioning the transferred data in a different portion of the same time slot.

Still another feature is the utilization in a two-dimensional memory which includes at least two delay devices adapted to store data in a given initial time slot of switching logic comprising a feedback path associated with each of the delay devices; at least an actuable gate interconnecting the feedback paths for transferring data therebetween and; additional delay means interposed in one of the feedback paths for temporally and spatially displacing the transferred data from the given initial time slot.

Still another feature is the utilization in a two-dimensional memory which includes a plurality of delay devices of switching logic consisting of a plurality of feedback paths each associated with a delay device; a first actuable gate serially disposed in each of the feedback paths; a second actuable gate connected between pairs of feedback paths for transferring data therebetween; a serially disposed inverter, a third actuable gate and bistable element electrically connected between each feedback path; said first and second actuable gates being responsive to the presence or absence of an electrical signal such that its presence activates the first gate and recirculates data through a delay device via its feedback path or such that the absence of said signal activates the second gate and transfers data from a feedback path to the next succeeding feedback path for circulation through its associated delay device.

The foregoing and other objects, features and advantages of the invention will be apparent from the following more particular description of a preferred embodiment of the invention, as illustrated in the accompanying drawings.

SYSTEM—GENERAL DESCRIPTION

Figure 1:
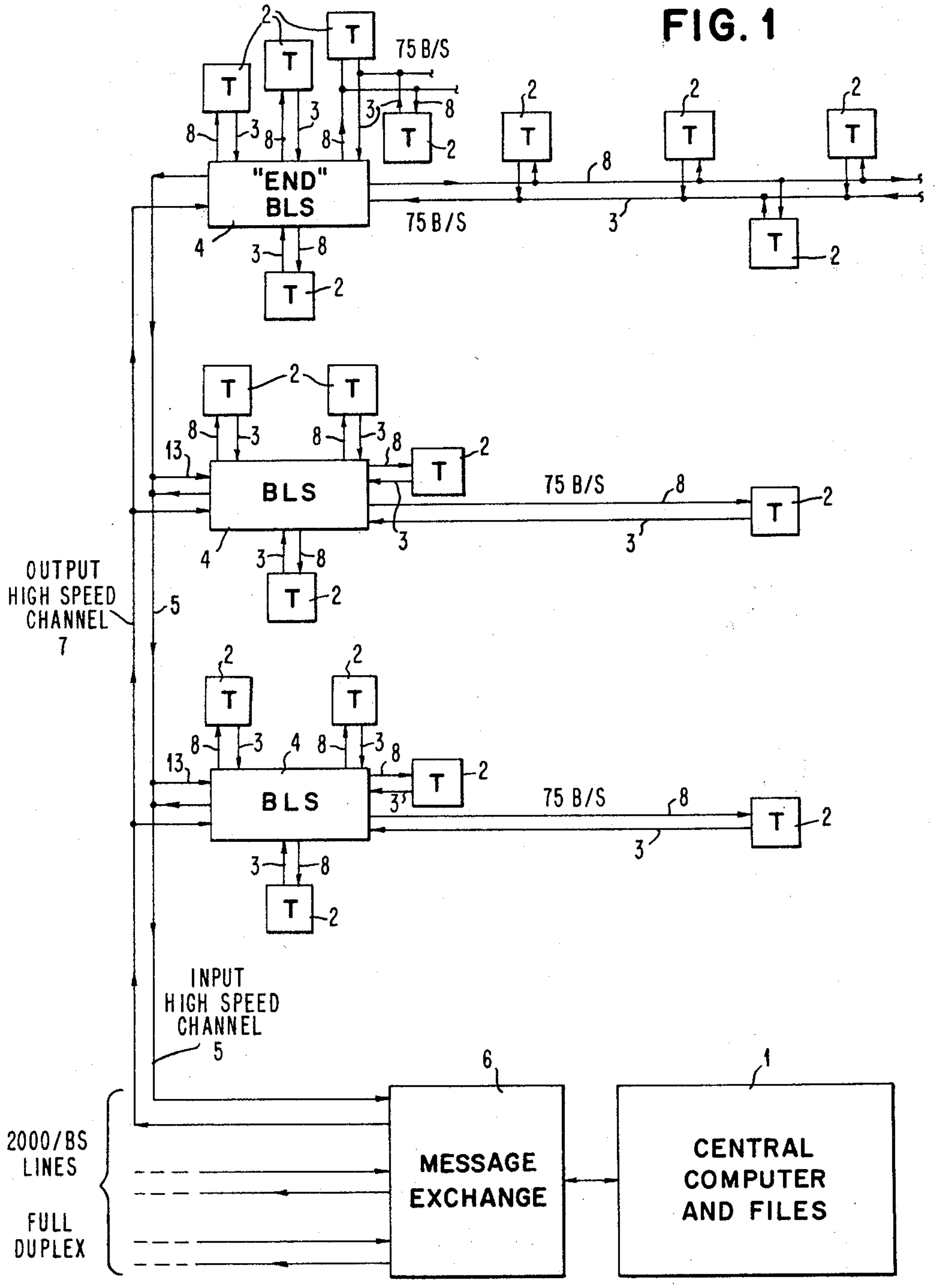
FIG. 1 shows a typical system configuration which includes the buffered line selectors which in turn utilize the two-dimensional memory of the present invention.

The two-dimensional memory disclosed herein can be utilized effectively in a system such as shown in FIG. 1. FIG. 1 shows a central computer and file 1 which, for purposes of information dissemination, must be connected to a plurality of terminals 2 which have the capability of interrogating computer 1 and receiving information therefrom in response to the interrogation. Requests for information are passed from a terminal 2 over a low-speed input channel 3 through a traffic concentrator or buffered line selector 4 to an input high speed channel 5. Input high-speed channel 5 serves a number of line selectors 4 which in turn serve a plurality of terminals 2 over their associated low-speed input channels. Information requests from terminals 2 enter a message exchange 6 which serves a number of high-speed channels. Message exchange 6 is connected to computer 1 from which information stored therein is rerouted through exchange 6 over an output high-speed channel 7 to an appropriate line selector 4 and from thence over low-speed output channel 8 to the interrogating terminal 2 where the desired information is printed out.

The system outlined above can be utilized as a ticket reservation system wherein a plurality of remotely located terminals interrogate a centrally located computer to determine the availability of seat reservations on a substantially real-time basis. Use is made of available telephone connections to transmit teletyped information to and from an interrogating terminal. Because the information rate is relatively low on the average from a given terminal, a number of terminals can be served by a single buffered line selector which connects a plurality of terminals to a single high-speed input and output line.

As can be appreciated, the flow of data, its control, storage, and distribution and timing of events must be strictly controlled to route information to and from a given terminal. All the functions of timing, routing, storage, and control of information are under control of the buffered line selector 4 of FIG. 1.

FUNCTIONAL DESCRIPTION

Figure 2:
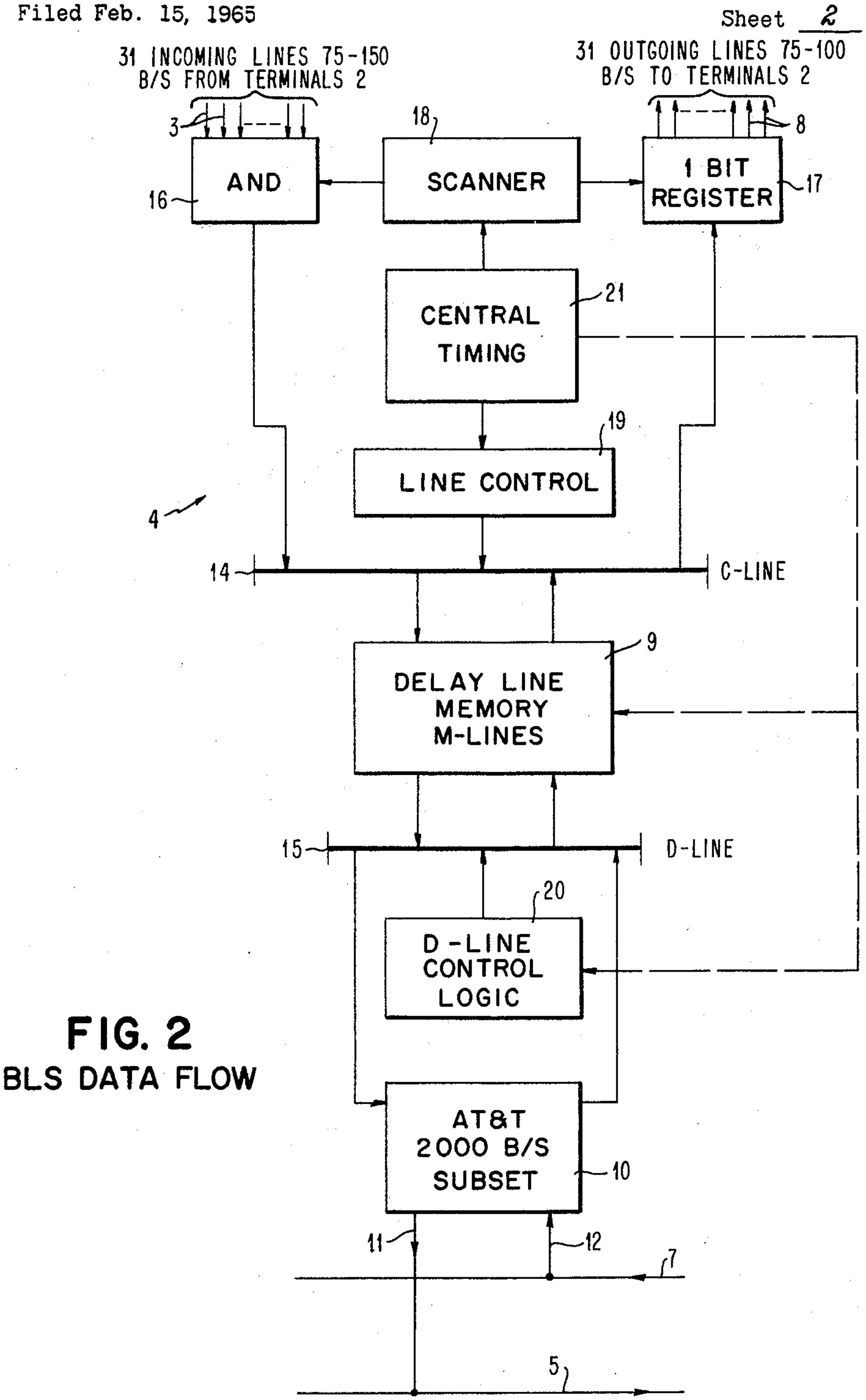
FIG. 2 shows, in block diagram form, the main elements of a buffered line selector which includes the two-dimensional delay lines memory of this invention. The flow of data is also indicated.

Referring now to FIG. 2 there is shown in block diagram form a buffered line selector 4 of FIG. 1. In general, line selector 4 is a traffic concentrator which utilizes ultrasonic delay line storage on an allocated basis and serial bit-by-bit data handling. The line selector operates full duplex and employs the "store and forward" principle. For purposes of this disclosure, the buffered line selector to be described will concentrate the traffic of thirty-one low-speed inputs (75 to 150 b./s.) on a single voice grade line (up to 3200 b./s.) operating at a 2000 b./s. rate.

For purposes of explanation, the term input information shall refer to data which go from terminals 2 to the computer 1. Output information shall refer to data which go from the computer 1 to the terminals 2. The input portion of the buffered line selector 4 is that portion which handles input information from the terminals 2 while the output section of the buffered line selector 4 is that portion which distributes data to the terminals 2 from computer 1.

The input data which the buffered line selector 4 receives from a terminal 2 over low-speed input line 3 is temporarily stored in a buffer storage delay line 14 called the "C-line" and is then passed to a delay line memory 9 shown in FIG. 2 with a capacity of 48 characters per terminal. The memory size is expandable to a maximum capacity of 624 characters per terminal in increments of 12 characters. Characters may be received at random. The buffered line selector 4 assembles bits into characters, characters into words, and words into message segments. Completed segments are tagged and queued in memory 9 to await transmission to computer 1 by way of a buffer storage line 15 called the "D-line." Buffered line selector 4 is connected by two standard four phase, 2000 b./s. subsets (one transmitter and two receivers) to the full duplex voice grade line. A simplified connection to the high-speed channels by way of a standard AT&T 2000 b./s. subset 10 is shown in FIG. 2. Subset 10 is connected to input and output high-speed channels 5 and 7 by means of connections 11 and 12, respectively.

In operation, the buffered line selector 4 continuously monitors the 2000 b./s. input line for a "clear to send" message. This message consists of a "go ahead" (GA) character and a buffered line selector address (RA). Upon receipt of a "go ahead" character and the RA assigned to a buffered line selector, the buffered line selector starts transmitting. At this point, queued message segments from delay line memory 9 are fed to the input high-speed channel 5 by way of D-line 15 until memory 9 is empty of message segments. A message segment can be either a "filled message segment" (at least 24 characters) or an "end of message segment" (less than 24 characters). The message segment portion provides for input messages of more than 24 characters. The end of message segment is used for messages of less than 24 characters and for the last segment of long messages.

A buffered line selector 4, when sending, provides control information to the system such as its address, character sync, and the low-speed channel address or terminal 2 associated with that buffered line selector. When the buffered line selector 4 has emptied its memory 9 of complete message segments, it sends a "clear to send message" to another buffered line selector on the input side of the high-speed channel utilizing high-speed input channel 5 and connections 13 as shown in FIG. 1. When the next buffered line selector detects its "clear to send" messages, it begins to transmit. The "end" buffered line selector on the high-speed line as shown in FIG. 1 is the first to transmit and must receive its "clear to send message" from the computer. This scheme is characterized as the hub-go-ahead scheme.

In addition, the buffered line selector 4 constructs and sends a longitudinal parity check character for every message segment transmitted and does not remove any of the eight data bits in each character even if some are used for vertical parity checking. For every received output message segment, the buffered line selector compares its constructed parity character with the longitudinal parity character it received. If an error is detected, action is taken to advise the operator.

In the event of a malfunction or removal from a line of a buffered line selector, a message on the high-speed output channel 7 can instruct the buffered line selector that normally sends a clear to send message to the malfunctioning buffered line selector, to send a clear to send message to a different buffered line selector, thereby effectively bypassing the malfunctioning buffered line selector on the high-speed input channel.

It should be appreciated that the buffered line selector 4 is not limited to the characteristics shown here by way of example. The message segment size and the buffer size can be varied to suit a particular requirement without major changes. By relatively simple design changes, the buffered line selector can be adapted to other low-speed line rates and numbers and high-speed line rates up to 25000 b./s.

Referring again to FIG. 1, the 2000 b./s. output from message exchange 6 which is placed on output high-speed channel 7 contains information for a specific terminal 2 on a particular low-speed output channel 8 of a buffered line selector 4. All the buffered line selectors 4 are monitoring the information of output high-speed channel 7. When a buffered line selector 4 is addressed, it then determines to which of its low-speed channels 8 the information is addressed and the information is stored in memory 9 by way of D-line 15 as shown in FIG. 2. At this point, the buffered line selector 4 reads this information into the 24 character output buffer C-line 14 from delay line memory 9; a given time slot of C-line 14 being associated with a particular low-speed channel 8. The buffer memory or C-line 14 begins to send the information to the correct low-speed output channel 8. The first character from the buffer or C-line 14 to the low-speed channel 8 has a terminal address. A terminal 2 only records the message if it has detected its terminal address. It should be appreciated that a terminal can transmit and receive simultaneously.

All thirty-one low-speed channels associated with a given buffer line selector 4 can transmit simultaneously. At the same time, all thirty-one channels can be receiving information. This means a channel may be able to transmit and receive simultaneously, dictating the use of a full duplex or full wire line.

BUFFERED LINE SELECTOR DATA FLOW

The data flow to and from terminals 2 may be seen from a further consideration of FIG. 2. There is a gate for each of the thirty-one incoming lines and a one bit register for each of the thirty-one outgoing lines which are shown as blocks 16 and 17, respectively, in FIG. 2. A scanner 18 sequentially connects one gate at a time to C-line 14. C-line 14 contains an area of storage for each one of the thirty-one inputs and outputs. Within each one of these areas, called slots, data is assembled for distribution to computer 1 or to terminals 2. In the input direction, blocks of data three characters (24 bits) long are assembled. In the output direction, blocks of the same length are disassembled and transmitted to the terminals 2. These input and output operations are done substantially simultaneously for all thirty-one terminals. The necessary logic for this is associated with the C-line 14 and is shown as block 19 labelled C-line control in FIG. 2.

Blocks (3 characters long) which have been assembled in the C-line 14 are immediately transferred to memory 9 upon their completion. The memory 9 consists of four or more ultrasonic delay lines, called M-lines. Each one of the thirty-one inputs and thirty-one outputs has an area within memory 9 permanently assigned to it. In the input direction, memory 9 receives blocks of data from the C-line 14 and assembles the blocks into message segments. The segments are normally between twenty-four and forty-eight characters long. In the output direction, the C-line 14 transmits continuously to the terminals. Whenever transmission of a block is completed, a new block is received immediately from memory 9.

In a similar manner, D-line 15 is controlled by logic associated with it and is shown by block 20 in FIG. 2. The logic associated with D-line 15 effects all transfers of data between memory 9 and the 2000 b./s. lines. The D-line 15 is made short in order to have a shorter access time than the memory 9. It serves as a small intermediate bi-directional buffer element between memory and the 2000 b./s. lines. All delay lines in the system and the scanner 18 are rigidly synchronized. The Central Timing unit 21 in FIG. 2 provides all necessary timing pulses. It also determines where, in any one of the delay lines, a given piece of data is at any time.

Bits stored in the C-line 14 recirculate exactly once each time the scanner 18 makes one revolution in the manner of a rotary switch which has two banks of thirty-one evenly spaced contacts. This period is related to the bit rate on the telegraph lines and to the number of scans per bit. The actual scanner operates electronically and comprises a binary counter which counts up to thirty-one, and a decoding matrix producing a one out of thirty-one code. The binary counter is advanced by central timing 21.

For historical reasons, which are no longer too valid, a bit rate of 69 b.p.s. on the low-speed lines using 6 scans per bit is utilized. Provision can be made so that a very minor modification results in a different number of scans per bit. At least 3 scans per bit are required, but the input pulse distortion and timing becomes more critical with fewer scans. The following bit rates can be handled.

| Nominal line speed | Actual bit rate (b./s.) | Scans/bit | Approximate character rate |
|---|---|---|---|
| 56 b./s. (75 w.p.m.) | 51.7 | 8 | 5 |
| 64 b./s. (75 w.p.m.) | 59.1 | 7 | 6 |
| 74 b./s. (100 w.p.m.) | 68.9 | 6 | 7 |
| 90 b./s. (100 w.p.m.) | 82.7 | 5 | 9 |
| 112 b./s. (100 w.p.m.) | 103.4 | 4 | 10 |
| 150 b./s. (200 w.p.m.) | 137.8 | 3 | 14 |

For intermediate bit rates, the central clock 21 can be slightly readjusted, and delay line lengths made compatible with the new clock rate.

In the examplary embodiment to be described in detail hereinafter, at a bit rate of 69 bits, each bit has a nominal length of 14.508 ms. The scan rate is ⅙ of this or 2418 μs. The scanner 18, therefore, completes one full revolution every 2418 μs. The C-line 14 also has a length (delay) of 2418 μs., including its feedback loop.

The scanner 18 dwells on each input $\frac{1}{31}$ of a full revolution or, 2418/31=78 μs. Subdividing C-line 14 into thirty-one timeslots, each slot is 78 μs. long. A particular slot is permanently allocated to a given low-speed channel. Since all the delay lines of the system are designed to operate with a 1 mc. pulse repetition frequency, each slot stores 78 bits. Each slot is then subdivided into two adjacent semislots, each 39 μs. long, and one semislot is assigned to handle the input traffic to a given terminal while the other semislot handles the output traffic of the same terminal. Within each semislot the bit positions are numbered from 1 to 39. Twenty-four of those bits are used to store data and twelve of the remainder are needed to store housekeeping information. The information retained at each of the bit positions will be described in detail in what follows.

Because the scanner 18 and C-line 14 are exactly synchronized, access may always be had to a particular slot when the scanner 18 establishes connection to the corresponding low-speed channel. Slots and channels are served sequentially, and the same control logic is time shared by all of them.

The M-lines of memory 9 are exactly twice the length (delay) of the C-line 14, or 4836 μs. and are capable of storing 4836 bits. Each M-line is subdivided into slots, similar to the C-line 14, but each M-line slot is twice as long as a C-line slot.

Each slot in an M-line stores eighteen characters (or $18\times8=144$ bits) of data, in addition to twelve (6 groups of two each) control bits totaling 156 bits. If four M-lines are used, a total storage capacity of 72 characters per channel and slot is realized. Of these, 48 characters are allocated for input and 24 characters are allocated for output. With only very minor modifications additional M-lines may be added. The addition of each new line increases the total storage capacity of every channel by 18 characters and changes in the control logic circuitry design are minimal.

The following tabulation gives the relationship between some numbers of memory lines and storage capacity per low-speed channel.

| No. of M lines (minimum) | Input storage capacity, characters | Output storage capacity, characters | Total storage capacity, characters |
|---|---|---|---|
| 4 | 48 | 24 | 72 |
| 5 | 60 | 30 | 90 |
| 6 | 72 | 36 | 108 |
| 8 | 96 | 48 | 144 |
| 10 | 120 | 60 | 180 |
| 12 | 144 | 72 | 216 |
| 20 | 240 | 120 | 360 |
| 26 | 312 | 156 | 468 |
| 40 | 480 | 240 | 720 |

Of the total storage capacity per slot, ⅔ is allocated to input and ⅓ to output; however, other subdivisions are possible.

Figure 3:
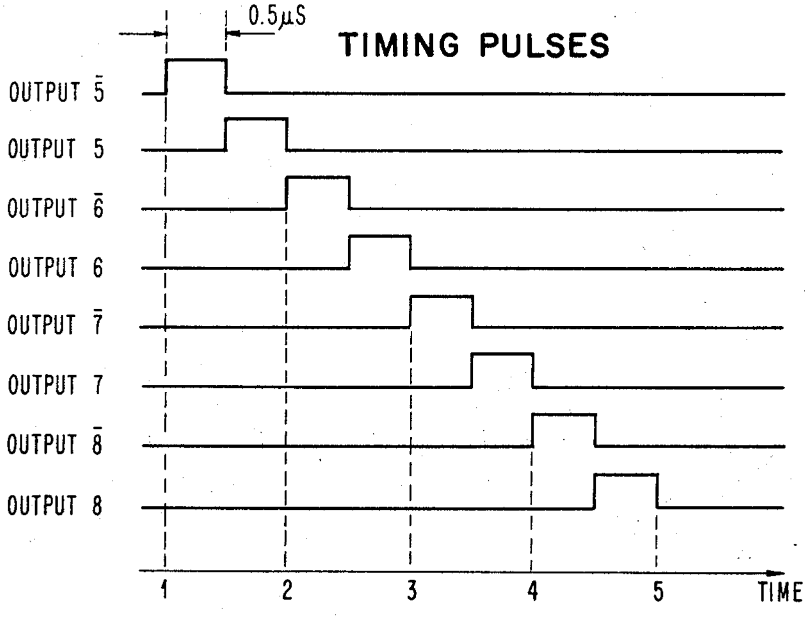
FIG. 3 shows a timing diagram of the pulses provided by the central timing block of FIG. 2 which provides the basic synchronizing for each unit within the buffered line selector.

D-line 15 has a length of 312 μs. It contains four slots of seventy-eight μs. each. These slots are time shared by all low-speed channels. Part of central timing 21 of FIG. 2 is a 2 mc. crystal, which provides the basic synchronizing pulses. Every logical unit within buffered line selector 4 is controlled by this clock. The master clock steps a counter (not shown) once every 1 μs. This counter counts to 3 and then is automatically reset. A decoding matrix (not shown) provides 39 timing pulses, 1 μs. apart and ½ μs. wide. The outputs are numbered 1, 2 . . . 39, giving time 1, time 2, time 3, . . . time 39. Each of these times refers to the ½ μs. wide pulse. A second decoding matrix (not shown) operated by the same counter, produces a similar set of 39 output pulses. These pulses are ½ μs. earlier than those of the first matrix. The ½ μs. outputs of the second matrix are called $\bar{1}, \bar{2}, \bar{3}, \bar{4}, \bar{5}$, . . . etc. The timing diagram of FIG. 3 shows the order in which the timing pulses are arranged.

The 39-counter can be arranged to count in Gray code rather than in binary code to eliminate transient voltage spikes at the outputs of the decoding matrix during the counter transitions. Such arrangements are well known to the skilled in this art.

DETAILED DESCRIPTION

Scanner

A scanning circuit which may be utilized as the scanner 18 of FIG. 2 shown in detail in a copending patent application Ser. No. 120,282 entitled "Scanning Circuit" in the name of Wilhelm G. Spruth and assigned to the same assignee as the present application.

Figure 4:
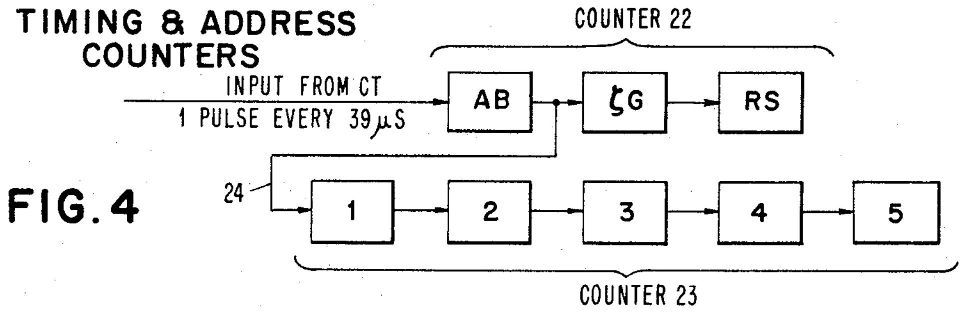
FIG. 4 shows a block diagram of two binary counters, one of three stages and a second of five stages which is incorporated in the scanner block of FIG. 2.

Scanner 18 also contains two binary counters, 22 and 23 characterized as timing and address counters and shown in FIG. 4. Counter 22 is a three stage counter while counter 23 is a five stage counter. Counter 22 counts to 8, and is stepped every 39 μs. by a pulse derived from central timing 21. The first stage AB of counter 22 indicates whether a semislot in C-line 14 and D-line 15 is an input (A) semislot or an output (B) semislot. This last statement will become more meaningful when the organizations of the C and D-lines are discussed. The second stage ζG of counter 22 provides timing pulses for M-lines and the third stage RS serves to address a particular slot in the D-line. The first stage AB of counter 22 also drives counter 23 via connection 24 which is thus stepped every 78 μs., and counts to thirty-one. It serves as a terminal address (or low-speed channel) generator. In addition, a decoding matrix (not shown) connected to it provides a 1-out-of-31 code at its outputs. These outputs operate the 31 input gates and 31 output gates which connect the incoming and outgoing low-speed channels to the buffered line selector.

C-line organization and control

Each semislot of C-line 14 contains thirty-nine bit positions. These positions are numbered (1 . . . 39) in such a way that position 1 appears first at the output of a sense amplifier, followed in time by sequence by 2, 3 . . . 39.

One particular point within the feedback loop of C-line 14 is a reference point (R-C). The bit positions within the C-line are defined such that position 1 is at R-C at time 1; position 2, at time 2 (1 μs. later); and so on.

The 39 bit positions are assigned as follows:

Position 1 ------------ Not used.
Position 2 . . . 12 ---- Control information.
Position 13 . . . 36 --- Data (three 8 bit characters).
Position 37 . . . 39 --- Not used.

Figure 5:
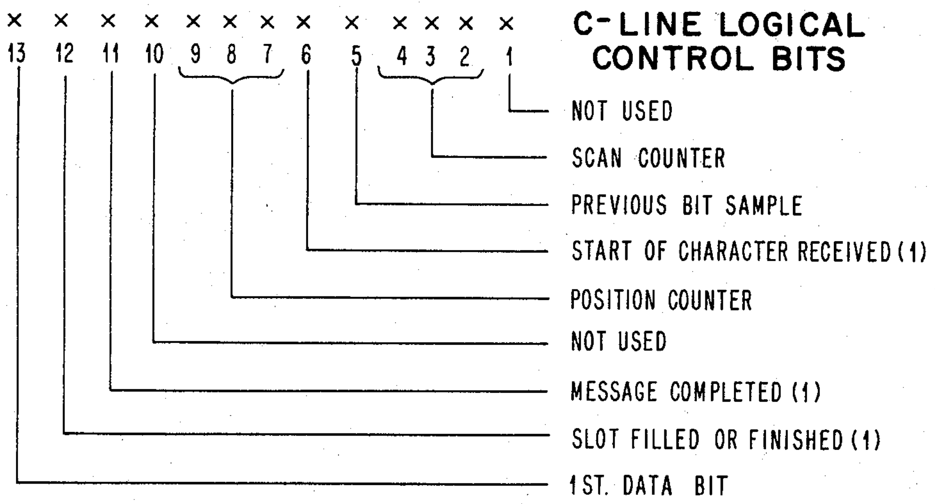
FIG. 5 shows the meaning of bit positions 1–12. Binary information in the given positions controls the C-line logic in the C-line control block of FIG. 2.
Figure 6:
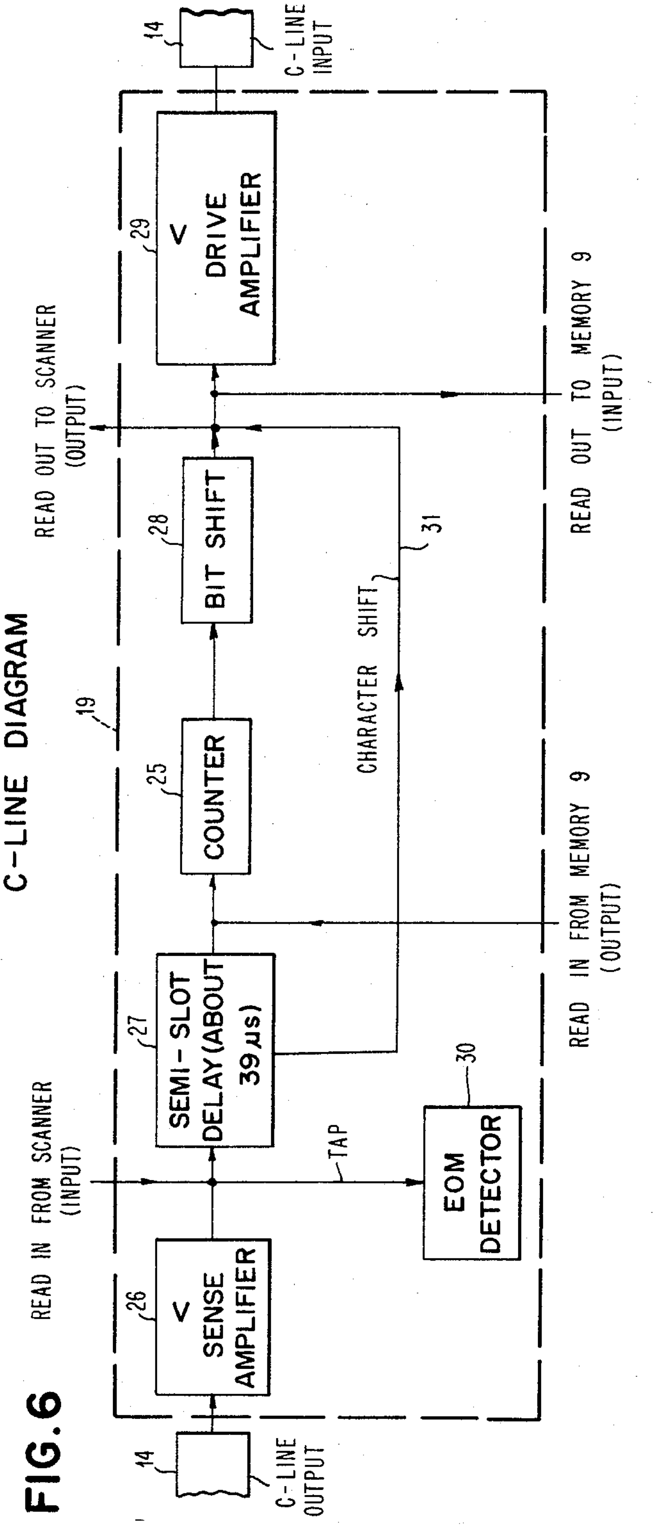
FIG. 6 shows a simplified block diagram of the C-line including a feedback path for data recirculation.

The meaning of position 1 . . . 12 is indicated in FIG. 5 and are further referred to in connection with the following discussion of FIG. 6 which shows a simplified block-diagram of C-line 14 and the elements of C-line control shown within dotted box 19.

Referring now to FIGS. 5 and 6, positions 2, 3, and 4 represent the number of times a bit read in from scanner 18 is sampled. Positions 2, 3, and 4 represent a binary number to which a binary 1 is added each time a bit is sampled. It is reset to 000 after it reaches the state 101, or by an external signal.

At this point, it should be recalled that each bit arriving at one of the inputs of the buffered line selector 4 is sampled or scanned approximately six times. Only one of these samples, however, is regarded as the bit state and stored away. The binary number in positions 2, 3, and 4 indicates how often each bit arriving at each input has already been sampled.

The updating of the sample or scan counter is accomplished in counter 25 of FIG. 6. All information stored in the C-line 14 appears serially by bit at a sense amplifier 26 which consists of a transducer to convert sonic impulses to digital-type electrical signals and an electrical amplifier well known to those skilled in this art at the output end of the line. The information normally travels through a semislot delay 27 (somewhat less than 39 μs.). the counter 25, bit shift 28, the drive amplifier 29 which applies a digital pulse to a transducer which energizes C-line 14 to C-line 14 in a total time of 2418 μs. Data entering counter 25 normally passes through it unchanged. However, on a given signal counter 25 modifies the data so that the output will equal the input plus a binary 1. The three bits in positions 2, 3, and 4 (sample or scan counter) are modified in this manner at every revolution. Bit positions 7, 8, and 9 (position counter) are modified (increased by 1) whenever the incoming bit state is read into C-line 14 (about every 6th revolution). When this counter is at 111, (binary eight) and another bit is read in, it is known that another full 8-bit character has been assembled. At every revolution, bit position 5 is reset to zero. Immediately afterwards, the state of the bit sample is read into this position. At every recirculation of the data or revolution of the C-line 14, the state of position 5 is compared with the new sample state. If the two bits are unequal, then a transition from a zero to a one bit or vice versa has occurred on that input line. This information is used to reset the sample counter 25 because a new bit is being scanned and the counter must be set to 000 and show this condition at bit positions 2, 3, and 4.

Before starting to receive a character, position 6 is zero. When a SOC (start of character) bit is received, position 6 is set to one, but it is not recorded as data. Data is recorded only if position 6 is a one. A semislot is filled when three characters are assembled therein. This is indicated by reading a one bit into position 12 causing the immediate transfer of this block of data into the main memory 9.

Data is always read from scanner 18 into position 36. Immediately afterwards all data in positions 13 through 36 are shifted forward by one bit position under control of bit shift block 28 in FIG. 6. The bit which has been read into position 36 is then in 35. After 24 bits have been read in, the bit which originally was in position 36 is now in 13. The semislot is filled, position 12 of FIG. 5 is set to one, and the block is transferred to the main memory 9. This scheme of reading in and assembling data does not require the knowledge of how many bits have already been assembled. It requires only a one-bit overflow indicator.

The overflow indicator, or "slot filled" detector operates only when a full character has been assembled. It tests positions 13 through 20 for presence of any 1 bit. The all zero (00000000) character is invalid. This method also protects data against a single bit noise pulse on the lines between characters.

When the terminal sends the last character of a message, it may happen that this is the first or second character assembled within the corresponding semislot. This means that positions 13 through 20 are still zeros and that they stay empty because no further characters will be received. A detector 30 in FIG. 6 detects the unique EOM (end of message) character, which is always the last character of a message. Upon detection of EOM, a one bit is placed in position 11 of FIG. 5 and data starts to shift right eight bits (1 character at a time) by way of character shift connection 31 until positions 13 through 20 contain one bits. Then, position 12 in FIG. 5 is set to one and the word is transferred to the main memory 9.

In the output direction, the same arrangement of a sample or scan counter 25 and a position counter is used as for input. The sample counter 25 is stepped up at every revolution and counts up to six. Every time it reaches 101 (binary 6) it is reset. Every time it has the count 001, a new bit is read out of C-line 14 into scanner 18. When a bit is read out, the position counter is advanced one count and positions 13 through 36 are shifted one bit under control of bit shift 28. Whenever the last bit of a character (position count 111) is read out, positions 13 through 20 are tested for 1 bits. When the semislot is empty, the one bit in position 12 in FIG. 5 is erased and a new block is transferred from memory 9 to C-line 14.

Buffered line selector 4 also sends a SOC (start of character) bit preceding each character. When no data is available, buffered line selector 4 sends a continuous string of zero bits. When buffered line selector 4 sends a one bit to one of its outputs, it maintains an output level corresponding to the one state for 14.5 ms. (6 revolutions). Each one of the 31 output gates 17 of FIG. 1 has the facility to receive the bit (as a 0.5 $\mu$s. pulse) and to store it for one bit period of the low-speed channel. The circuit used is shown in FIG. 7.

Figure 7:
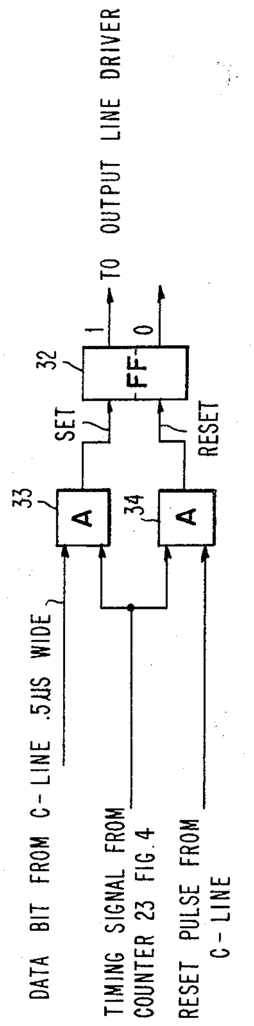
FIG. 7 shows a simplified block diagram of the output to a low-speed line.

Whenever a bit is sent by C-line 14, it is sent to all the output circuits one of which is shown in block diagram form in FIG. 7. However, only one of the circuits receives the timing signal from counter 23 (FIG. 4) and is conditioned. If the bit is a one bit, it sets the flip-flop (FF) 32 through AND gate 33. A zero bit leaves flip-flop 32 reset. A few microseconds before flip-flop 32 receives the next bit, it receives a reset signal from C-line 14 through AND gate 34. The output of the flip-flop 32 drives the outgoing telegraph line driver.

Memory organization

Figure 8:
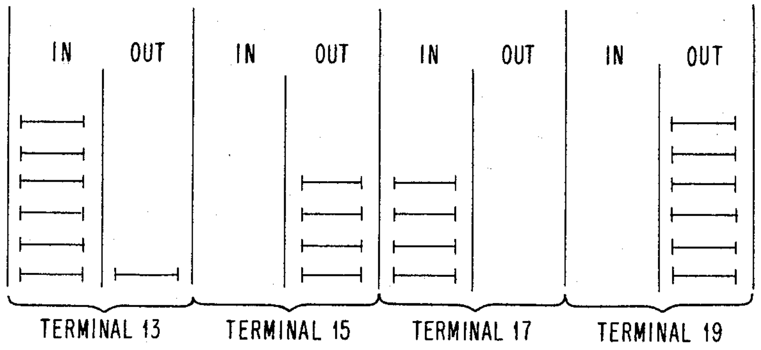
FIG. 8 is a simplified representation of typical individual terminal queues.

The buffered line selector 4 main memory 9 consists of four M-lines. A memory containing more lines can be achieved with the same organization. Additional lines may be inserted between the second and third M-lines. An adjustment in timing of ½ $\mu$s. is needed for each additional line added. Memory 9 of FIG. 1 is a self-organizing, two-dimensional, delay line memory. It is self-organizing, because no external status or control information is needed to move blocks of data within the memory. It is two-dimensional, because blocks are transferrable from one line to another, or from one location within the same line to another. Memory 9 is essentially a queuing memory. It contains 62 queues, 31 for input, and 31 for output. Each terminal has an input queue and output queue permanently associated with it. A symbolic representation is shown in FIG. 8. Each queue is completely independent from any other one. Words of three characters each are entered into the memory by putting them on the top of their corresponding queues. Words leave the memory by being pulled out from the bottom of a queue. In the latter case, the queues adjust themselves by moving all remaining words one notch down in the queue.

Slot arrangement and slot sequence

The C-line 14 has 31 slots, each subdivided into a B-semislot for output data and an A-semislot for input data. At the sense amplifier 26 of FIG. 6, the B-semislot appears first, followed by the A-semislot of the same terminal. Terminals are numbered consecutively from 1 through 31. Their slots appear in this sequence at the sense amplifier 26.

Figure 9:
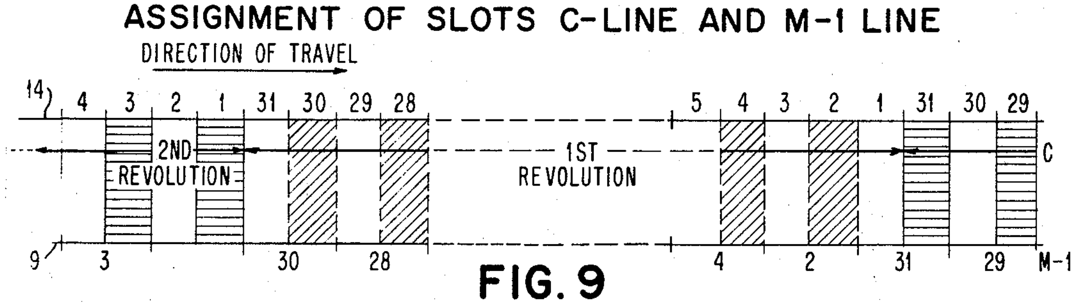
FIG. 9 is an illustration showing the relationship between the slots of the C-line and the M–1 line of the main memory.

Each M-line of memory 9 has 31 slots, one for each terminal. Since each M-line is exactly twice as long as the C-line, it follows that each M-slot is twice as long (156 $\mu$s.) as each C-slot (78 $\mu$s.). The M-line slots are arranged in the sequence: . . . 28, 30, 1, 3, 5, 7, 9 . . . 29, 31, 2, 4, 6 . . . 26, 28, 30, 1, 3 . . . FIG. 9 shows the juxtaposition of the C-line slots and the slots of the first M-line designated the M–1 line. At every second revolution or recirculation of data, a given slot in the C-line 14 has access to a corresponding slot in the M–1 line, or to be more specific, to the first half of the slot in the M–1 line. Recalling that in FIG. 4 the second stage of counter 23 switches every 78 $\mu$s., whenever this stage is in the one state, C-line 14 has access to the memory 9.

Figure 10:
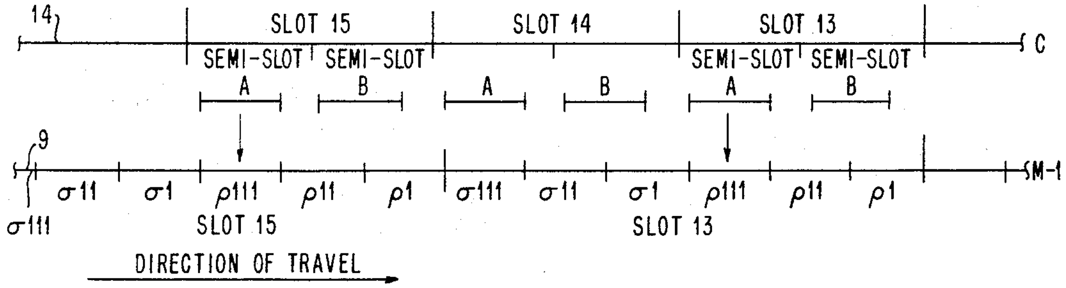
FIG. 10 is an illustration showing the relationship between the input blocks of the slots on the C-line and the input block positions of the M–1 line in the main memory.

FIG. 10 shows a magnified portion of FIG. 9. Here slot 13A in C-line 14 and storage position $\rho$III in M–1 are aligned and data may be exchanged by means of circuitry to be discussed more fully hereinafter. Slot 15A in C-line 14 will be aligned 156 $\mu$s. later. Slot 14 has to wait one revolution (2418 $\mu$s.) before it gets access to the memory. At the instant shown in FIG. 10, semislot 14A is aligned with storage position $\sigma$III of slot 13, so no exchange of data can be made.

Returning to FIG 9, it can be seen that during the first revolution or data recirculation that slots 2, 4, etc., on C-line 14 overlap portions of the corresponding slots (note diagonal shading) on line M–1 of memory 9. The data in the C-line slots, as it passes a given reference point, is converted from a mechanical impulse to an electrical signal and by appropriate circuitry to be shown later is reconverted to a mechanical impulse in the corresponding slot in the M–1 line. During the second revolution or data recirculation, slots 1, 3, 5, etc., are aligned as they pass a predetermined reference point and data is transferred in the manner described above from the semislot on C-line 14 to the corresponding semislot on M-line M–1. (Note horizontal shading in FIG. 9.) Returning to FIG. 10, slot 13 of C-line 14 contains one block of data in its B-semislot and another block in the A-semislot. Because less housekeeping information is required for the M-lines and also because it has twice the length, the M-line is able to store six blocks of data, each 26 bits long. These blocks or storage positions are designated:

$$\rho_1, \rho_2, \rho_3, \sigma_1, \sigma_2, \sigma_3$$

in the sequence in which they are sensed by an appropriate transducer. Blocks or storage positions $\rho_1$ and $\rho_2$ are assigned to output functions, and the remainder to input functions.

Figure 11:
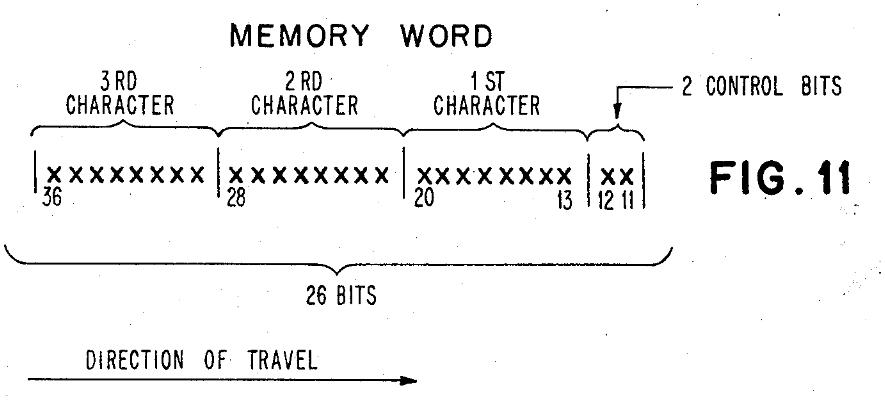
FIG. 11 shows the organization of a memory word in the main memory.

The remaining delay lines in memory 9 have block spaces or storage positions allocated in exactly the same fashion as the M–1 line and, in a system having four delay lines, the other three lines are designated M–2, M–3 and M–4, respectively. Each block contains two control bits followed by 24 data bits. Thus, each of the M-lines stores 12 characters per terminal in the input direction (three—eight bit characters times four slots) and 6 characters independently per terminal three—eight bit characters times two slots) in the output direction. The word arrangement in an M-line slot is shown in FIG. 11. The control bits are shown in FIG. 11 in positions 11 and 12. The data bits are in positions 13 through 36. The same frame of reference is used for all blocks or storage positions. Positions 1 through 10 are non-existent in the M-lines, and the position numbering above is used to indicate the same bit positions in both C-line 14 and M-lines (M–1–M–4).

Block or storage position transfer

Input block transfer

Figure 12:
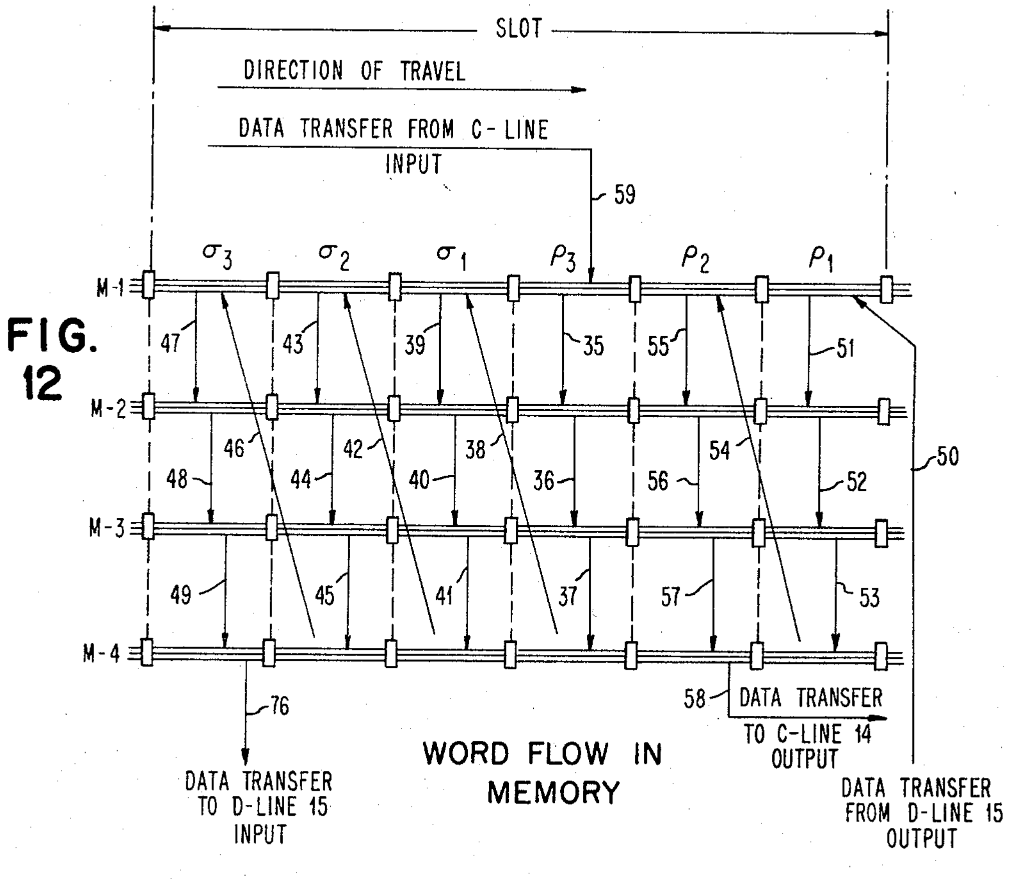
FIG. 12 shows a flow diagram of word transfer between the input and output portions of the delay lines and the main memory.

Referring now to FIG. 12, the transfer of data to the M-lines, between the M-lines and from the M-lines is shown symbolically for a representative slot. Input data blocks which are made available by the C-line 14 are transferred to block location or storage position $\rho_3$ of the same slot number in the M–1 line. The transfer is executed during one revolution or data recirculation of C-line 14. Not only are the 24 data bits transferred, but the bit in position 12 is also transferred. If any block in memory contains data, it is tagged by a 1 bit in position 12. A blank block is indicated by 0 in position 12.

During the transfer to $\rho_3$ of M–1, block space $\rho_3$ of delay line M–2 is tested for data. If empty, data in $\rho_3$ of M–1 is transferred to $\rho_3$ of delay M–2 as indicated by arrow 35 in FIG. 12. From $\rho_3$ of M–2, blocks transfer to $\rho_3$ of M–3 and then to $\rho_3$ of M–4 as shown by arrows 36, 37, respectively. A block in $\rho_3$ of M–4 may be transferred in the same revolution to block space $\sigma_1$ in the M–1 line as indicated by arrow 38 if this space is empty. From $\sigma_1$ of M–1, it may go to $\sigma_1$ of M–2 as indicated by arrow 39. The future sequence is $\sigma_1$ of M–3 (arrow 40), $\sigma_1$ of M–4 (arrow 41) $\sigma_2$ of M–1 (arrow 42), . . . $\sigma_3$ of M–2, (arrow 47) $\sigma_3$ of M–3 (arrow 48) $\sigma_3$ of M–4 (arrow 49). From block $\sigma_3$ in the M–4 line data is ready to be transferred to the D-line 15 of FIG. 1. All these transfers are subject to the condition that the block space into which data is transferred is not occupied. As soon as the $\sigma_2$ and $\sigma_3$ blocks in all the M-lines are filled, a service request indicator for that particular terminal is set. This is done by setting position 11 as shown in FIG. 11 in block $\sigma_3$ of M-line to one.

Output block transfer

Ouput data blocks made available by the D-line are transferred to block space $\rho_1$ in the M-1 line as shown by arrow 50. From these the transfer sequence is to $\rho_1$ of M–2 (arrow 51), $\rho_1$ of M–3 (arrow 52) and so on by following the sequentially numbered arrows in FIG. 12. Blocks which are in $\rho_2$ of the M–4 line are ultimately transferred to the corresponding B-semislot in the C-line 14 as indicated by arrow 58 in FIG. 12.

M-Line memory word transfer circuitry

Figure 13:
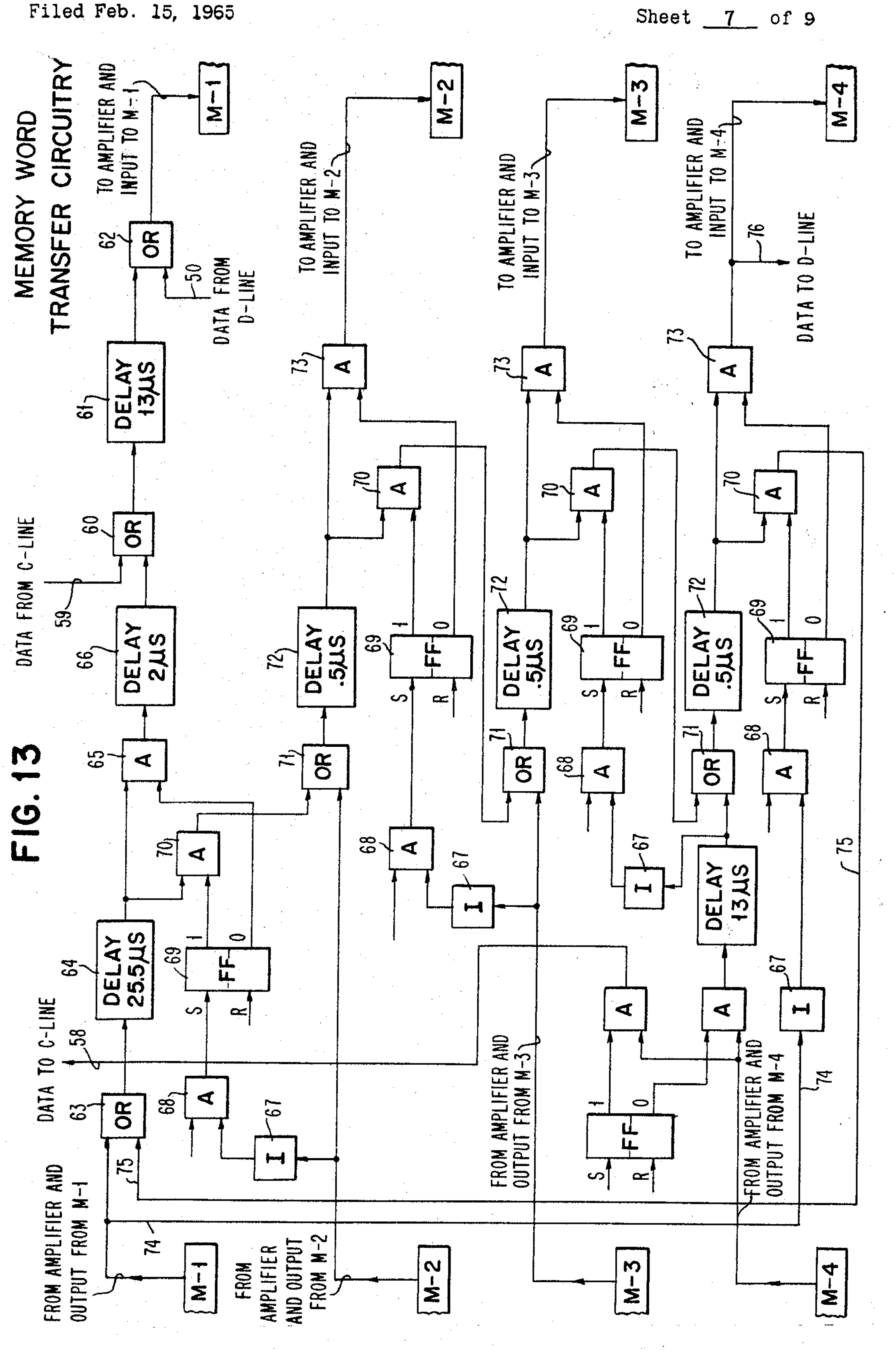
FIG. 13 shows a block diagram representation of the word transfer circuitry utilized on a time shared basis in transferring data between the delay lines of the main memory.

To implement the two-dimensional transfer of data between the M-lines of memory 9, the circuit arrangement of FIG. 13 has been developed which permits the storage of information and the transfer of information between delay lines as well as movement along the length thereof. Referring to FIG. 13, data from C-line 14 is transferred over lead 59 to OR gate 60 which is serially interposed in the feedback loop of delay line M–1. At this point, it should be recalled that each time a one bit is detected in bit position 12 of the C-line control information data, data is transferred from C-line 14 to line M–1 of memory 9. The delay lines M–1, M–2, M–3, M–4, the extremities of which only are shown in FIG. 13, are conventional magnetostrictive delay lines which, when actuated by a magnetic field from a transducer propagate a mechanical impulse at sonic speeds along the length thereof. Delay lines of conventional types, well known to those skilled in the delay line art may be utilized in the practice of this invention. Data from C-line 14, passes through OR gate 60 and passes through delay device 61, OR gate 62 to an amplifier (not shown), a transducer (not shown) to the input end of delay line M–1. The data circulates along the length of M–1 where at the output end of M–1 data is reconverted to electrical signals, passes through OR gate 63, delay device 64, AND gate 65, and delay 66. The data keeps recirculating until a control signal opens a path which permits the transfer of the data to a correspondingly numbered slot in delay line M–2. The transfer of data is accomplished as follows. Assume that a block of characters has been transferred from C-line 14 and is circulating in a $\rho_3$ portion of an input semislot of delay line M–1. Also, assume that the sequence of transfers discussed in connection with FIG. 12 is to be undertaken. Thus, the data in the $\rho_3$ position of M–1 is to be transferred to the $\rho_3$ portion of a corresponding semislot of line M–2. If data is present in the $\rho_3$ portion of line M–2, a one bit from control position 12 of FIG. 11 enters inverter 67 which is directly connected into the feedback path of delay line M–2 where it is converted to a zero. Because of this, AND gate 68 which is serially connected to inverter 67 and a flip-flop 69 is not conditioned and flip-flop 69, which is normally in the reset condition remains reset causing AND gate 65 to remain in a conducting state thereby permitting the data in question to recirculate through delay line M–1 again. If, however, $\rho_3$ of M–2 is empty, a zero in a control position 12 enters inverter 67 where it is converted to a one output which conditions AND gate 68. The output of gate 68 causes flip-flop 69 to be changed from its normally reset condition to a set condition and an output is provided which conditions AND gate 70 to a conducting condition. AND gate 70 is connected between pairs of delay lines, (M–1 and M–2) and (M–2 and M–3) for instance. The data from $\rho_3$ of M–1 passes through gate 70, enters OR gate 71 and appears in the feedback path of delay line M–2 through an amplifier and transducer neither of which are shown in FIG. 13. The data in $\rho_3$ of M–2 must now be passed to M–3 and M–4. The transfer is accomplished in the same manner as described above in connection with the transfer of data from M–1 to M–2 and the elements associated with delay lines M–2, M–3, and M–4 which perform the same functions as described in connection with delay line M–1 have been given the same reference numbers. After data has been transferred to $\rho_3$ of M–4, it must be transferred to $\sigma_1$ of M–1. This transfer of data is begun by obtaining a zero signal over lead 74 which energizes the same elements as described above and ultimately transfers the data over lead 75 to OR gate 63 in the feedback loop of delay line M–1. The data, of course, remains in a slot associated with a particular terminal on each delay line. The only difference a transfer of data from the M–4 line to the M–1 line makes is that the transferred block has been displaced from its original position by 26 bits by means of delay device 64 which is serially interposed in the feedback path of M–1. The transfer of data, of course, continues until the $\sigma_2$ and $\sigma_3$ portions of the delay line have been passed and at an appropriate time the data relating to a given slot is passed to the D-line 15 over lead 76 to D-line 15 which is the buffer storage delay line between buffered line selector 4 and the input and output high-speed channels. In this connection, OR gate 62 passes data from D-line 15 over lead 50 to the $\rho_1$ section of the B-semislot which stores data which is to be fed to C-line 14 and then ultimately to one of terminals 2. The transfer of data over lead 50 from D-line 15 may be determined from FIG. 12 by simply following the sequentially numbered arrows to lead 58. Lead 58 is also shown in FIG. 13. While the transfer operation has been shown for one slot only, it should be appreciated that the elements shown in FIG. 13 are utilized on a time-shared basis such that all thirty-one terminals can be served on a serial basis with data flowing for any given terminal in the input and output directions substantially simultaneously. The logical elements utilized in the above described switching logic are standard device available everywhere and well known to those skilled in the electronic art.

D LINE CONTROL

Figure 14:
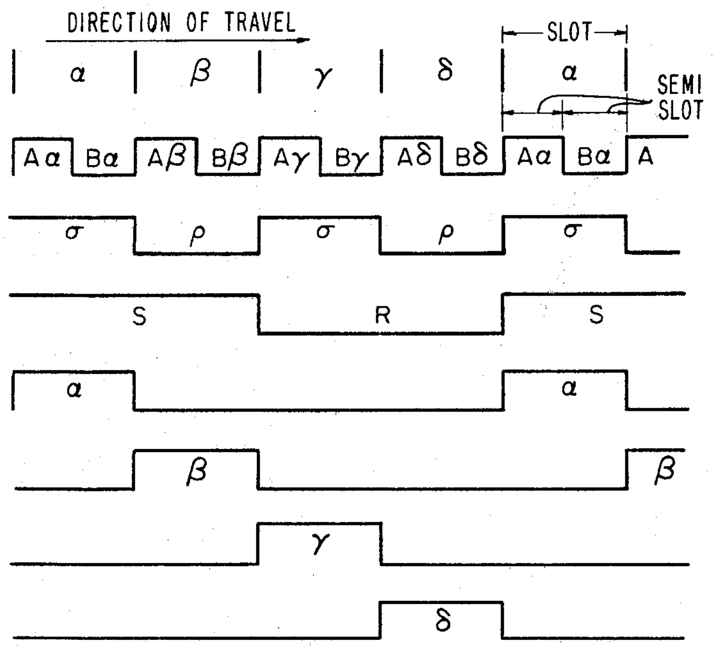
FIG. 14 shows the timing waveforms which control the operation of the D-line interface delay line.

The D-line 15 has a total length of 312 $\mu$s. and contains 4 slots, of 78 $\mu$s. each and acts as a buffer storage between buffered line selector 4 and the input and output high-speed channels, 5 and 7, respectively. These slots are synchronized with the C-line slots and have the same format. Each slot as shown in FIG. 14 is subdivided into a B-semislot for output data and an A-semislot for input data. Bit positions are numbered consecutively from 1 through 39. Positions 1 through 12 contain control information, position 13 through 36 contain 1 block (3 characters or 24 bits) of data. The four slots are called $\delta$, $\gamma$, $\beta$, and $\alpha$ and appear in that sequence. The semislots are referred to as A$\delta$, A$\gamma$, A$\beta$ and A$\alpha$ for input and B$\delta$, B$\gamma$, B$\beta$ and B$\alpha$ for output. All the necessary timing pulses to address any one of those semislots are derived from stage RS of counter 22 (FIG. 4). FIGURE 14 also shows the relationship between the timing signals from counter 22 and the semislots which they address.

The D-line slots are not assigned to any particular terminal, but are used by whichever M–4 slot is transmitting and whichever M–1 line slot is receiving on the high-speed channel.

High speed channel data transfer

When the BLS4 is ready to transfer data to the high-speed input channel memory 9 is searched for a slot which has data available for transmission. Such a slot is marked by a one bit in position 11 of block $\sigma_3$ of M–3. The detection of a one bit in position 11 causes the block $\sigma_3$ of M–3 upon transfer to $\sigma_3$ of M–4 to be marked by a one bit in position 11 and transfer of data from $\sigma_3$ of M–4 to the D-line is initiated. The transfer continues until this slot contains no more data in memory.

The first block of 24 bits is transferred into D-line semislot A$\gamma$ shown in FIG. 14. The second block goes into semislot A$\alpha$. Twenty-four bits start to transfer from A$\gamma$ to a sending subset. When finished, control is transferred to semislot A$\alpha$ and transmitting starts from there. With a high-speed channel bit rate of 2000 b./s., it takes 12 ms. to empty semislot A$\alpha$. During these 12 ms. semislot A$\gamma$ searches for the appropriate slot in memory to obtain another block of data. The search requires a maximum of 2 revolutions of the M–4 line (slightly less than 10 ms.). When A$\alpha$ is empty A$\gamma$ has data ready. Control is switched back to A$\gamma$ and transmission is continued from this semislot. Meanwhile A$\alpha$ searches for another block of data from memory 9. While transmitting, an LRC (longitudinal redundancy check) character is accumulating in semislot A$\beta$. More will be said about this feature later.

The AT&T subset 10 on the high-speed input channel 5 of FIG. 2 is buffered by a 2 position shift register (not shown). Each time a bit is requested, it is shifted out of this shift register. Shifting occurs once every 500 $\mu$s. The D-line 15 has a chance to load the shift register every 312 $\mu$s. Thus, a maximum bit rate of about 3200 b./s., in the input direction, can be handled without any modification.

In the output direction, data from the subset 10 is read into either semislot B$\beta$ or B$\delta$. While one semislot assembles a word of data, the other semislot has time to transfer a previously assembled block into its corresponding slot in main memory 9.

High speed message format

Figure 15:
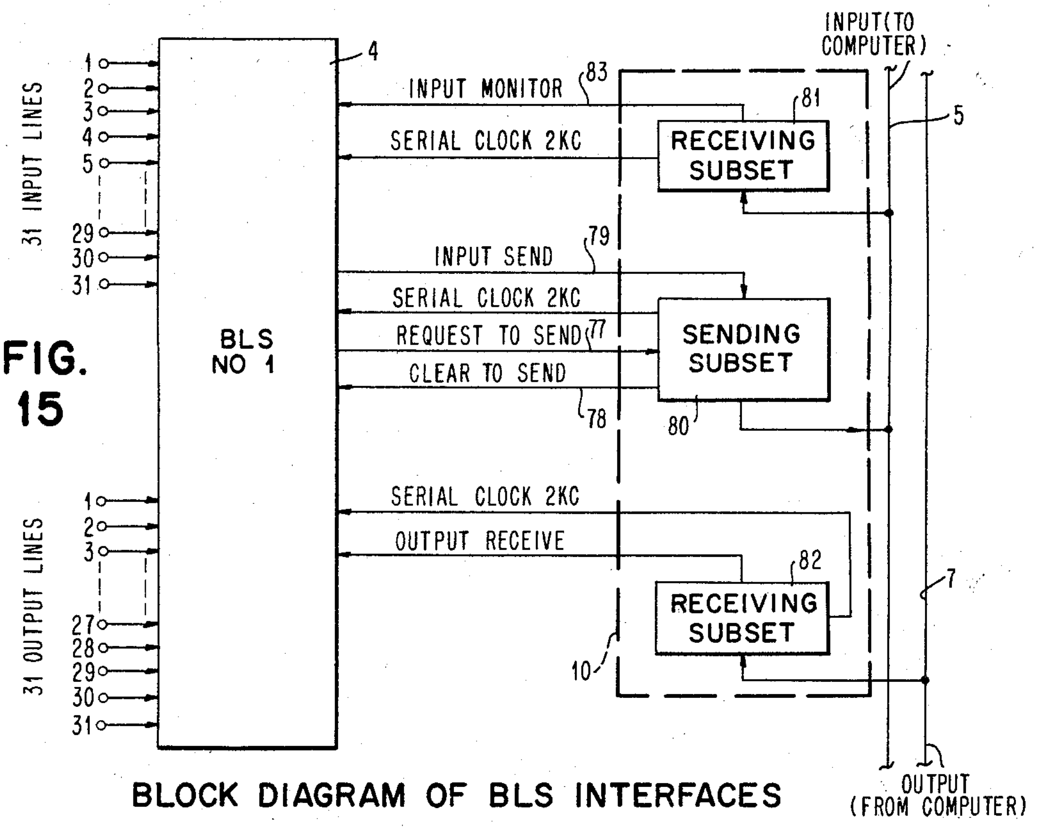
FIG. 15 shows a block diagram of the buffered line selector interface wiring connections.

Whenever a buffered line selector 4 starts sending data to the computer, it first raises the "request to send" line 77 to the subset 10 shown in FIG. 15. Upon receipt of the "clear to send" signal on line 78 from subset 10, the line selector 4 sends two characters of character synchronization over line 79. Following this, message segments are transmitted. The input message format is as follows:

| | |
|---|---|
| RA | Buffered Line Selector Address. |
| TA | Terminal address (actually the address of the low-speed channel on which the input message arrives at the BLS). |
| . | |
| . | |
| . | |
| DATA | |
| . | |
| . | |
| . | |
| $EOM_c$ | When this character is present, it indicates that the message is complete; i.e., a complete message itself or the last segment of a many-segment message. |
| LRC | Logitudinal redundancy check character. |
| $EOM_l$ | The $EOM_l$ character serves to indicate the end of a segment of a message. It is always sent independently of whether a $EOM_c$ character has been sent before. |

The last data character may be essentially an "End of Message" character, inserted by the terminal. Independently of this, the line selector 4 always sends an $EOM_l$ character after the data.

Any number of segments from the 31 terminals having the form shown above may be sent consecutively. When all segments have been sent, the line selector 4 sends a special three character message.

| | |
|---|---|
| RA | Buffered Line Selector address. |
| GA | Unique go ahead character. |
| NRA | Next Buffered Line Selector address. Address of a line selector further down the line toward the computer, which is to start sending. |

The above message terminates transmission from the particular line selector 4 and the "request to send" line 77 to the transmitting subset 10 is turned off.

In the output direction (from computer to BLS to terminal), a different message format is received:

| | |
|---|---|
| CS | Character synchronism, 2 characters long. |
| RA | Buffered Line Selector address. |
| TA | Terminal address, actually the address of the low-speed channel to which the message goes. |
| . | |
| . | |
| . | |
| DATA | Data, normally 24 characters if 4 memory lines are used. |
| . | |
| . | |
| . | |
| EOM | End of message character. |
| LRC | Logitudinal redundancy check character. |

When the computer has sent a segment to a line selector 4, the length of time necessary for a line selector 4 to transmit it to a given terminal 2 is known. Only after this time period has elapsed, may the computer send another segment to the same terminal (or low-speed channel). However, segments for different low-speed output channels of the same line selector 4 may be sent without any time restrictions. All message segments travelling between a line selector 4 and computer 1 are checked by an LRC (logitudinal redundancy check) character. These segments are up to 51 characters long, including addressing. In the case of an input message LRC error, the computer program determines the action to be taken. In the case of an output LRC error, the error is detected in a line selector 4. In this case, the line selector inserts a special character at the end of the message segment data and forwards it to the terminal. The terminal operator is able to recognize it as such, and takes the necessary action. No LRC check is provided for the transmission between terminals and the line selector 4. The reason for this is that LRC generation and detection is relatively expensive to provide in each terminal and probably not economically justified. The 8 bit code still allows a relatively powerful vertical check, either through a fixed count 4 out of 8 code, or a BCD code with double interleaved parity check. Both codes provide adjacent double error detection.

High speed subset interface

The line selector 4 needs two, four-phase AT&T type subsets to connect it to a voice grade line, using the go-ahead polling method. A circuit diagram shows the detail of the subset connections in FIG. 15. If, however, only one line selector 4 is on the high-speed line, only one subset is required. Each subset 10 in FIG. 15 consists of a sending part and a receiving part referred to as the sending subset 80 and the receiving subsets 81, 82. Two receiving subsets, 81, 82 but, only one sending subset 80 are actually needed for the go-ahead method.

The line selector 4 uses a receiving subset 81 to monitor the input line. When line selector 4 detects GA and NRA over line 83 and the NRA is its own line selector address, line selector 4 raises the level on the request-to-send line 77 to the sending subset 80. This causes subset 80 to send two characters of bit synchronization, at which time subset 80 raises the clear-to-send line 78 to line selector 4. When the clear-to-send signal is received, line selector 4 starts to transmit the character synchronization group on input line 79 to sending subset 80. Either "roll call" or hub go ahead is possible.

In the output direction, line selector 4 continuously monitors the output line using subset 82. When CS and its own RA are detected this segment of data is accepted.

D-line block diagram description

Figure 16:
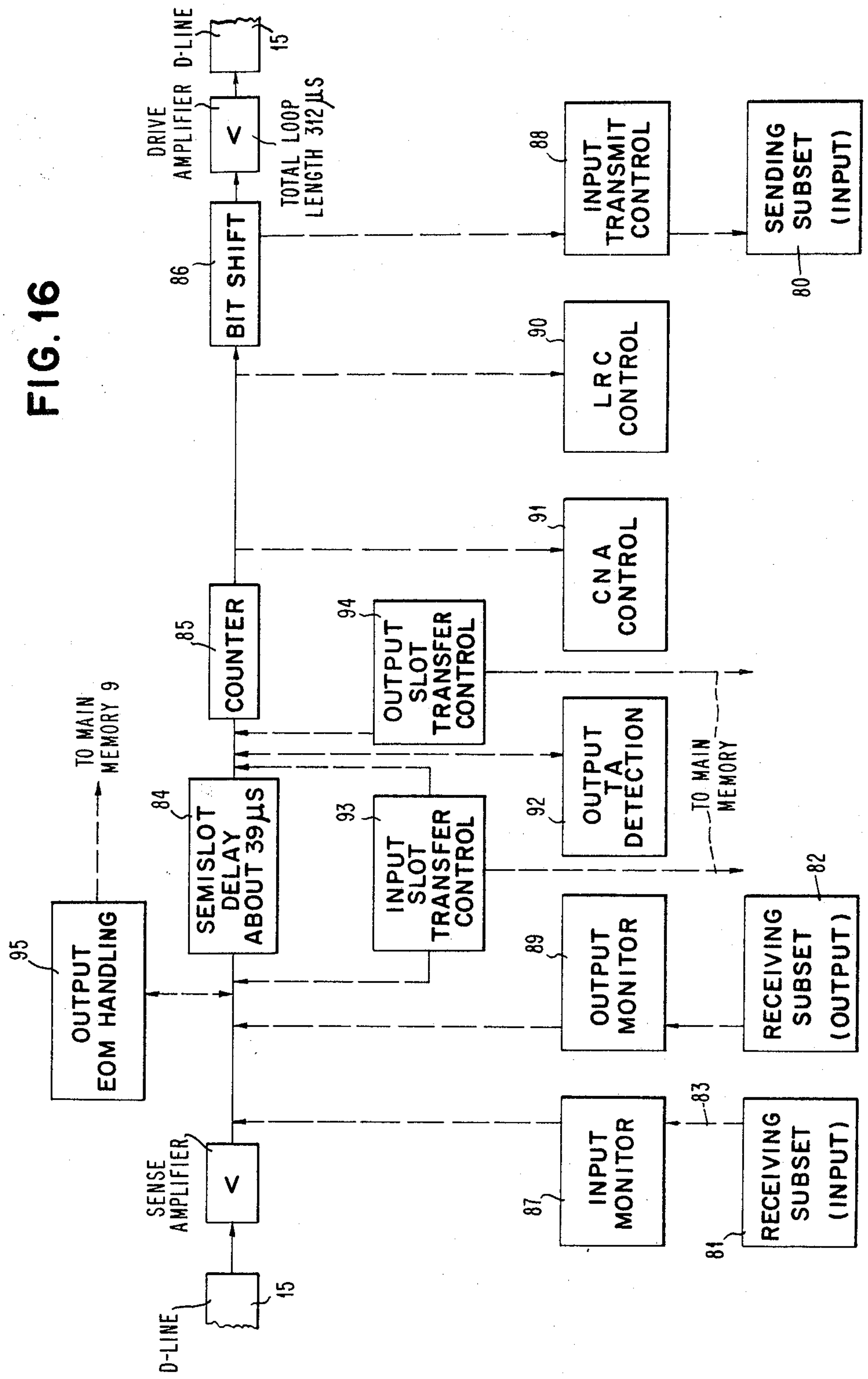
FIG. 16 shows a block diagram of the D-line data transfer and control functions.

A block diagram of the D-line control logic is shown in FIG. 16. The feedback loop of the D-line 15 essentially contains the same elements as the C-line 14 of FIG. 6. There is a delay 84 slightly shorter than one semislot length, a counter 85 and a shifting circuit 86. The latter two are identical to the elements described previously, under heading C-line Organization and Control.

This basic feedback loop is operated upon by the control units shown in FIG. 16.

Input monitor

The feedback loop is controlled as follows. Input monitor 87 in FIG. 16 monitors the input 2000 b./s. for information going from any line selector 4 further out the line to the computer.

All bits are continuously read into D-line 15 $A\beta$ semislot, and assembled into three character long blocks.

The blocks are analyzed to detect character synchronization which is used to synchronize the control unit with any line selector sending on the input line 83. If GA and NRA are detected, and the NRA is the address of the line selector receiving, sending may begin. If its NRA is not detected, the block is discarded.

Input transmit control

The input transmit control 88 in FIG. 16 effects the actual transfer of data from any one of the slots of an M-4 line of memory 9 through D-line 15 to sending subset 80 and computer 1. Bit clocking signals are provided by sending subset 80.

Input slot transfer control

As soon as the clear-to-send line from the sending subset 80 comes up, two synchronization characters and RA characters are loaded into semislot $A\beta$. Transmission is then started to subset 80. While this data is being transmitted, memory 9 is searched for a slot which has data ready to be transmitted. As soon as such a slot is found, the first block of data is read into semislot $A\gamma$, the second block into $A\alpha$, and the TA of this slot into semislot $A\delta$. When semislot $A\beta$ is empty, the TA is transmitted from $A\delta$. Following this, the first three characters of the segment from $A\gamma$ are sent. When $A\gamma$ is empty, it switches to $A\alpha$, which contains the second block of data. While $A\alpha$ is sending, the next block is read from the same M-4 memory slot $\sigma_3$ into $A\gamma$. This operation continues until this memory slot is empty. When the memory slot is empty, sending is started from semislot $Ab$, where the LRC character has accumulated in its first data character position. $EOM_1$ and RA are read into the next two character spaces. While $A\beta$ is sending, memory 9 is searched for another slot containing sufficient data to require transmission. If one is found, the first block is read into $A\gamma$, the corresponding TA into $A\delta$, and the cycle previously described is begun again.

At some time, however, no data is ready for transmission. Under such circumstances control is switched into semislot $B\gamma$ to transmit the GA-NRA message which is stored there. Data which is read out of $B\gamma$ in this manner is automatically restored, so that the GA-NRA message is always available for future use. This ends transmission, and line selector 4 switches back into the input monitoring mode.

Output monitor control

Output monitor 89 in FIG. 16 monitors the output line for segments with its own RA through subset 82. Monitor 89 also keeps continuous character synchronization. For this purpose, blocks of three characters are assembled and continuously discarded in the $B\alpha$ semislot. When the proper RA is detected, monitor 89 switches into the receive mode, and starts to accumulate three characters blocks of data alternatively in the $B\delta$ and $B\beta$ semislots of D-line 15. The first block is assembled in $B\delta$ with the TA as its first character (since the RA is discarded). Slot transfer is more straightforward in the output direction than in the input direction. If an LRC error occurs, a special LRC error character is inserted into either $B\beta$ or $B\delta$ and transferred to memory 9.

Upon completion of this output cycle the line selector 4 is switched back into the monitor mode.

LRC handling

Whenever sending input data or receiving output data, LRC characters are accumulating simultaneously. This is done in semislots $A\beta$ for input and $B\alpha$ for output. The same semislots are also used for monitoring. The accumulated input LRC character is sent to computer 1 at the end of an input message through LRC control unit 90 in FIG. 16. The accumulated output LRC character is used for comparison against the LRC character received from computer 1. The eight bits following the EOM character are added to the LRC character accumulated in semislot Bα using modulo 2 without carry. If there were an error, at least one 1-bit will remain in the LRC register of semislot Bα. An LRC error character is then placed in slot Bβ or Bδ and is transferred into memory 9, to be sent from there to the respective terminal through the C-line 14.

CNA control

When the computer wants to modify the go ahead message which a line selector 4 has stored in semislot Bγ, a special message is sent by CNA control unit 91 in FIG. 16 with this format:

| | |
|---|---|
| Buffered Line Selector address. | RA |
| Change next BLS address (unique character). | CNA |
| Go ahead. | GA |
| Next BLS address character. | NRA |

When a line selector 4 receives character synchronization and its RA, it switches control to semislot Bδ. There it accumulates the first character. If this character is not a TA character, but rather the unique CNA character, control is switched immediately to semislot Bγ. The next two characters, GA and CNA, then are read into Bγ and replace the information previously stored there. This terminates the operation of changing the next BLS address.

Output TA detection and block transfer

Comprising output TA detection 92 and input and output slot transfer control units 93, 94 respectively, this output unit is in a detection mode when not receiving, and in a transfer mode when feeding blocks of data from Bδ or Bβ into the appropriate slot in main memory 9. The first character in any message which a line selector 4 stores is the TA. At every revolution of C-line 14, the output line identity in serial form is available from scanner counter 23 of FIG. 4. The output line identity is compared with the received TA until coincidence is detected. Upon coincidence, a one bit is inserted into position 11 of an M-1 line. This serves as a tag and all following blocks are read into this slot. The mode control switch (not shown) is also set to the transfer mode.

Output EOM handling

A continuous test is performed to detect whether the last received character is EOM. Upon detection of EOM by EOM unit 95 in FIG. 16, the output monitor mode is re-entered.

The foregoing description has referred to ultrasonic delay devices of the magnetostrictive type for use in memory 9. It should be appreciated, however, that other delay devices well known in the art such as radio frequency delay lines can be utilized without departing from the spirit of this invention.

While the invention has been particularly shown and described with reference to a preferred embodiment thereof, it will be understood by those skilled in the art that various changes in form and detail may be made therein without departing from the spirit and scope of the invention.

What is claimed is:

1. In a two dimensional memory including at least two delay devices, switching logic comprising a feedback path associated with each of said at least two delay devices connecting the output thereof to the input and means coupled to each of said feedback paths for transferring data stored on each of said at least two delay devices to a different one of said feedback paths.

2. In a two-dimensional memory including a plurality of delay devices, switching logic comprising a feedback path associated with each said delay device connecting the output thereof to the input and means coupled to each of said feedback path consisting of an actuable gate for transferring data stored on each of said delay devices to a different one of said feedback paths.

3. In a two-dimensional memory including a plurality of delay devices switching logic comprising a feedback path associated with each said delay device and connecting the output thereof to the input and means coupled to each of said feedback paths consisting of an actuable gate for successively transferring data stored on each of said delay device to a different one of said feedback paths.

4. In a two-dimensional memory including $n$ delay devices switching logic comprising a plurality of feedback paths each associated with a delay device adapted to store data, different portions of said data being assigned to different portions of said data being assigned to different time slots, a first actuable gate coupled to each of said feedback paths for successively transferring said stored data of each of said delay devices to the next succeeding of said $n$ delay devices in the same time slot and a second actuable gate coupled between the first and last of said feedback paths for transferring said stored data therebetween and a delay element interposed in said first feedback path for placing said transferred data in a different portion of said same time slot.

5. In a two-dimensional memory including at least two delay devices adapted to store data in given initial time slots, switching logic comprising a feedback path associated with each said delay device, at least an actuable gate interconnecting said feedback paths for transferring data therebetween and additional delay means interposed in one of said feedback paths for temporally and spatially displacing said transferred data from said given initial time slot.

6. In a two-dimensional memory including a plurality of delay devices adapted to store data switching logic comprising a feedback path associated with each said delay device, a first actuable element serially disposed in each said feedback paths subject to switch over from a normally conducting state by the removal of an activating potential for recirculating said data through each of said delay devices and, a second actuable logical element coupled between said feedback paths and subject to a switch over from a normally non-conducting state by the application of an activating potential for recirculating said data among said delay devices.

7. In a two-dimensional memory including a plurality of delay devices switching logic comprising a plurality of feedback paths each associated with a delay device, a first actuable gate serially disposed in each of said feedback paths, a second actuable gate connected between pairs of feedback paths for transferring data between said feedback paths, and a serially disposed inverter, a third actuable gate and bistable element, electrically connected between each feedback path and said first and second actuable gates responsive to the presence or absence of an electrical signal such that the presence of said signal activates said first actuable gate and recirculates data through the delay device via its feedback path or the absence of said signal activates said second actuable gate and transfers data from a feedback path to the next succeeding feedback path for circulation through its associated delay device.

8. In a two-dimensional memory switching logic according to claim 7 wherein said first actuable gate is an AND gate.

9. In a two-dimensional memory switching logic according to claim 7 wherein said second actuable gate is an AND gate.

10. In a two-dimensional memory switching logic according to claim 7 wherein said inverter provides an output in the absence of an input signal and no output in the presence of an input signal.

11. In a two-dimensional memory switching logic according to claim 7 wherein said bistable element is a bistable multivibrator.

12. In a two-dimensional memory switching logic according to claim 7 wherein said third actuable gate is an AND gate.

References Cited

UNITED STATES PATENTS

| | | | |
|---|---|---|---|
| 3,302,176 | 1/1967 | McLaughlin | 340—172.5 |
| 3,065,304 | 11/1962 | Dawson | 340—173 X |
| 3,141,153 | 7/1964 | Klein | 340—173 |
| 3,185,823 | 5/1965 | Ellersick et al. | 333—29 |
| 2,902,217 | 9/1959 | Davis | 340—172.5 X |
| 3,316,544 | 4/1967 | Anderson | 340—174.1 |

TERRELL W. FEARS, *Primary Examiner.*

JOSEPH F. BREIMAYER, *Assistant Examiner.*

U.S. Cl. X.R.

340—172.5